United States Patent
Engelstad

(10) Patent No.: US 7,658,539 B2
(45) Date of Patent: Feb. 9, 2010

(54) TEMPERATURE SENSOR CONFIGURATION DETECTION IN PROCESS VARIABLE TRANSMITTER

(75) Inventor: Loren M. Engelstad, Norwood, MN (US)

(73) Assignee: Rosemount Inc., Eden Prairie, MN (US)

( * ) Notice: Subject to any disclaimer, the term of this patent is extended or adjusted under 35 U.S.C. 154(b) by 246 days.

(21) Appl. No.: 11/633,212

(22) Filed: Dec. 4, 2006

(65) Prior Publication Data

US 2008/0133170 A1 Jun. 5, 2008

(51) Int. Cl.
G01K 7/00 (2006.01)
G01K 13/00 (2006.01)

(52) U.S. Cl. .................. 374/163; 374/179; 374/185; 374/183; 327/512; 702/130; 702/133

(58) Field of Classification Search .............. 374/163, 374/183, 185, 179; 702/133, 130; 327/512
See application file for complete search history.

(56) References Cited

U.S. PATENT DOCUMENTS

| 2,647,237 A | 7/1953 | Herbst .................. 324/158 |
| 3,872,389 A | 3/1975 | Willard .................. 328/137 |
| 4,279,151 A | 7/1981 | Anderson ................. 73/343 |
| 4,475,823 A | 10/1984 | Stone ...................... 374/1 |
| 4,727,359 A | 2/1988 | Yuchi et al. ............ 340/870.17 |
| 4,783,659 A | 11/1988 | Frick .................. 340/870.17 |
| 4,841,286 A | 6/1989 | Kummer ................. 340/653 |
| 4,882,564 A | 11/1989 | Monroe et al. ......... 340/870.17 |
| 5,051,743 A | 9/1991 | Orszulak .............. 340/870.17 |
| 5,235,527 A | 8/1993 | Ogawa et al. ............. 340/653 |
| 5,294,890 A | 3/1994 | Hemminger et al. ........ 340/652 |
| 5,317,520 A * | 5/1994 | Castle ..................... 702/58 |
| 5,319,576 A | 6/1994 | Iannadrea .............. 340/870.17 |
| 5,350,237 A | 9/1994 | Hida .................... 340/584 |
| 5,677,476 A * | 10/1997 | McCarthy et al. .......... 73/29.01 |
| 5,700,090 A * | 12/1997 | Eryurek ................. 374/210 |
| 5,703,575 A | 12/1997 | Kirkpatrick ............ 340/870 |
| 5,829,876 A * | 11/1998 | Schwartz et al. ........... 374/1 |
| 6,519,546 B1 * | 2/2003 | Eryurek et al. ........... 702/130 |

(Continued)

FOREIGN PATENT DOCUMENTS

EP 0 917 028 A1 10/1998

(Continued)

OTHER PUBLICATIONS

"STT 3000 Smart Temperature Transmitter, Model STT350 Operator Manual", Honeywell, EN1I-6162, Issue 8, Jul. 1999, 34 pages.

Primary Examiner—Gail Verbitsky
Assistant Examiner—Mirellys Jagan
(74) Attorney, Agent, or Firm—Westman, Champlin & Kelly, P.A.

(57) ABSTRACT

A process variable transmitter for measuring a temperature of a process includes a first, a second, third, and fourth terminal configured to couple to the temperature sensitive element. Measurement circuitry measures an electrical parameter between a pair of the terminals. A microprocess identifies a location of the temperature sensitive element coupled to at least two of the terminals based upon an electrical parameter measured by the measured circuitry between two terminals. In another configuration, the process variable transmitter measures temperature of a process using a thermocouple. A heating element is configured to heat terminals coupled to the thermocouple. A microprocessor determines polarity of the thermocoupled based upon a measured electrical parameter between the terminals in response to applied heat.

12 Claims, 8 Drawing Sheets

U.S. PATENT DOCUMENTS

2006/0161271 A1 * 7/2006 Kirkpatrick et al. .......... 700/27

FOREIGN PATENT DOCUMENTS

| EP | 1 431 768 A1 | 11/2003 |
| --- | --- | --- |
| JP | 06194234 | 7/1994 |
| JP | 2005233737 | 9/2002 |
| WO | WO 2005/062012 | 7/2005 |

* cited by examiner

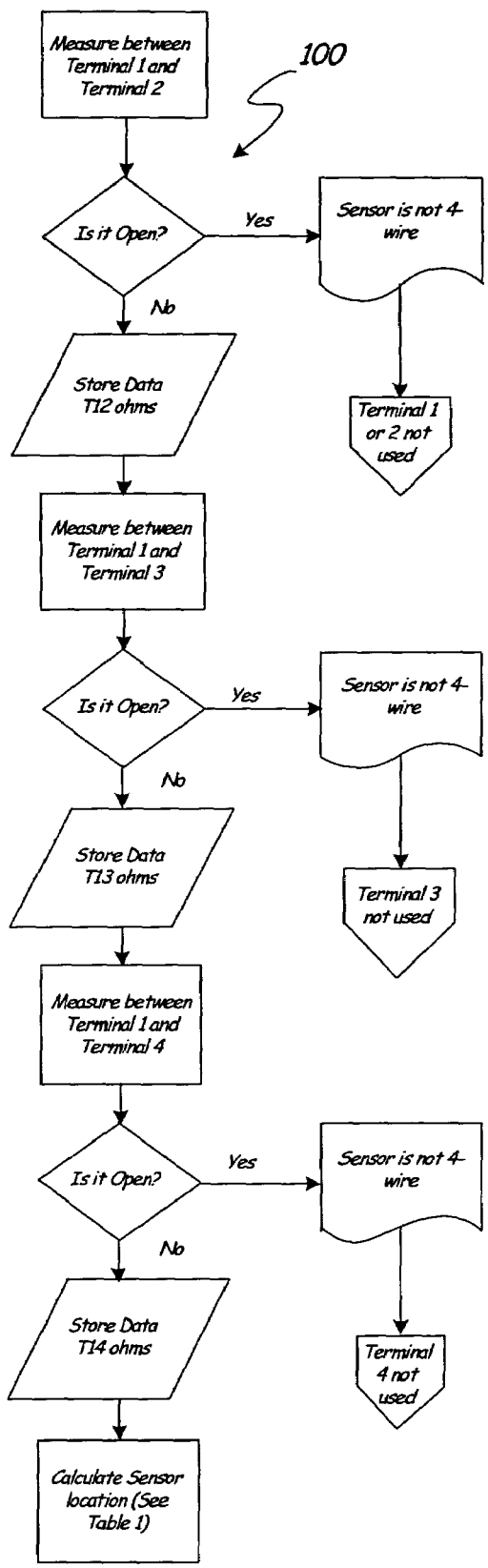
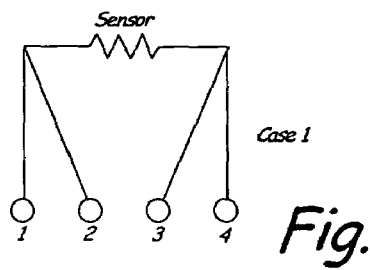
Fig. 2B
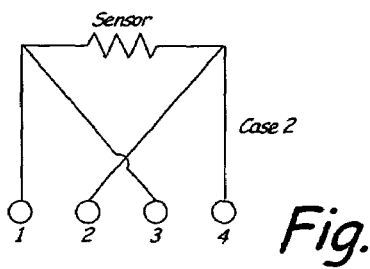
Fig. 2C
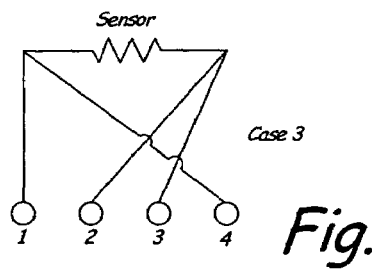
Fig. 2D
Fig. 2A

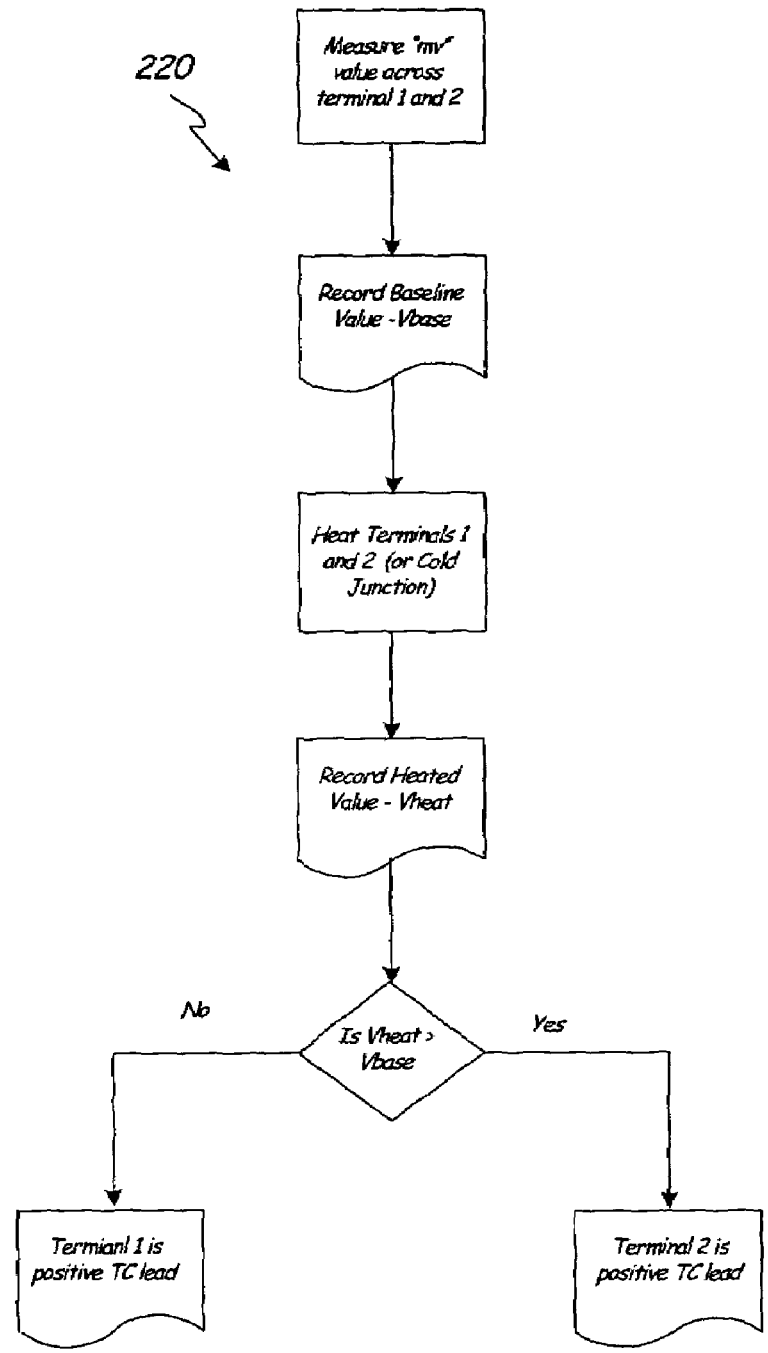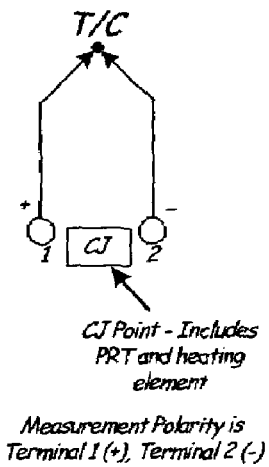
Fig. 8A
Fig. 8B

TEMPERATURE SENSOR CONFIGURATION DETECTION IN PROCESS VARIABLE TRANSMITTER

BACKGROUND OF THE INVENTION

The present invention relates to process variable transmitters used in process control and monitoring systems. More specifically, the present invention relates to the termination of the configuration or orientation of a temperature sensor coupled to a process variable transmitter.

Process control transmitters are used to measure process parameters in a process control system. Microprocessor-based transmitters include a sensor, an analog-to-digital converter for converting an output from a sensor into a digital format, a microprocessor for compensating the digitized output and an output circuit for transmitting the compensated output. Typically, this transmission is over a process control loop, such as a 4-20 mA current loop. One example parameter is temperature which is sensed by measuring the resistance of an RTD (Resistive Temperature Device), also called a PRT (Platinum Resistance Thermometer) sensor, or a voltage output of a thermocouple sensor.

Temperature is measured by converting the sensory output (resistance to voltage) to an output indicative of temperature of the sensor. However, in order for the process variable transmitter to obtain the desired measurement, the circuitry of the transmitter must be properly configured. For example, some RTD sensors use a four wire Kelvin connection while other sensors use a three wire connection. Similarly, although thermocouples typically use only two wires, there is a polarity between the two wires. It is known to detect whether a RTD utilizes three or four wires (see, for example, the STT 3000 Smart Temperature Transmitter, model STT 350 Operator Manual). However, the RTD must still be coupled in a known manner. This can be either in a predetermined manner or in a manner which is identified using some type of user input.

SUMMARY

A process variable transmitter for measuring a temperature of a process. The transmitter couples to a temperature sensor. The transmitter is configured to determine a manner in which the temperature sensor is coupled to the transmitter. A method is also provided.

BRIEF DESCRIPTION OF THE DRAWINGS

FIG. 2A is a flow chart showing steps performed by the temperature transmitter.

FIGS. 2B, 2C and 2D show cases 1, 2 and 3 respectively of an orientation of an RTD.

FIG. 8A is a flow chart showing steps performed by the temperature transmitter.

FIG. 8B shows a configuration of a thermocouple.

DETAILED DESCRIPTION

The present invention is directed to a process variable transmitter which is configured to identify the configuration or orientation of a temperature sensor which is coupled to the device. Examples include identification of a two, three or four wire RTD, the position or location of an RTD element between the terminals of the transmitter, or the position or polarity orientation of a thermocouple.

Figure 1A:
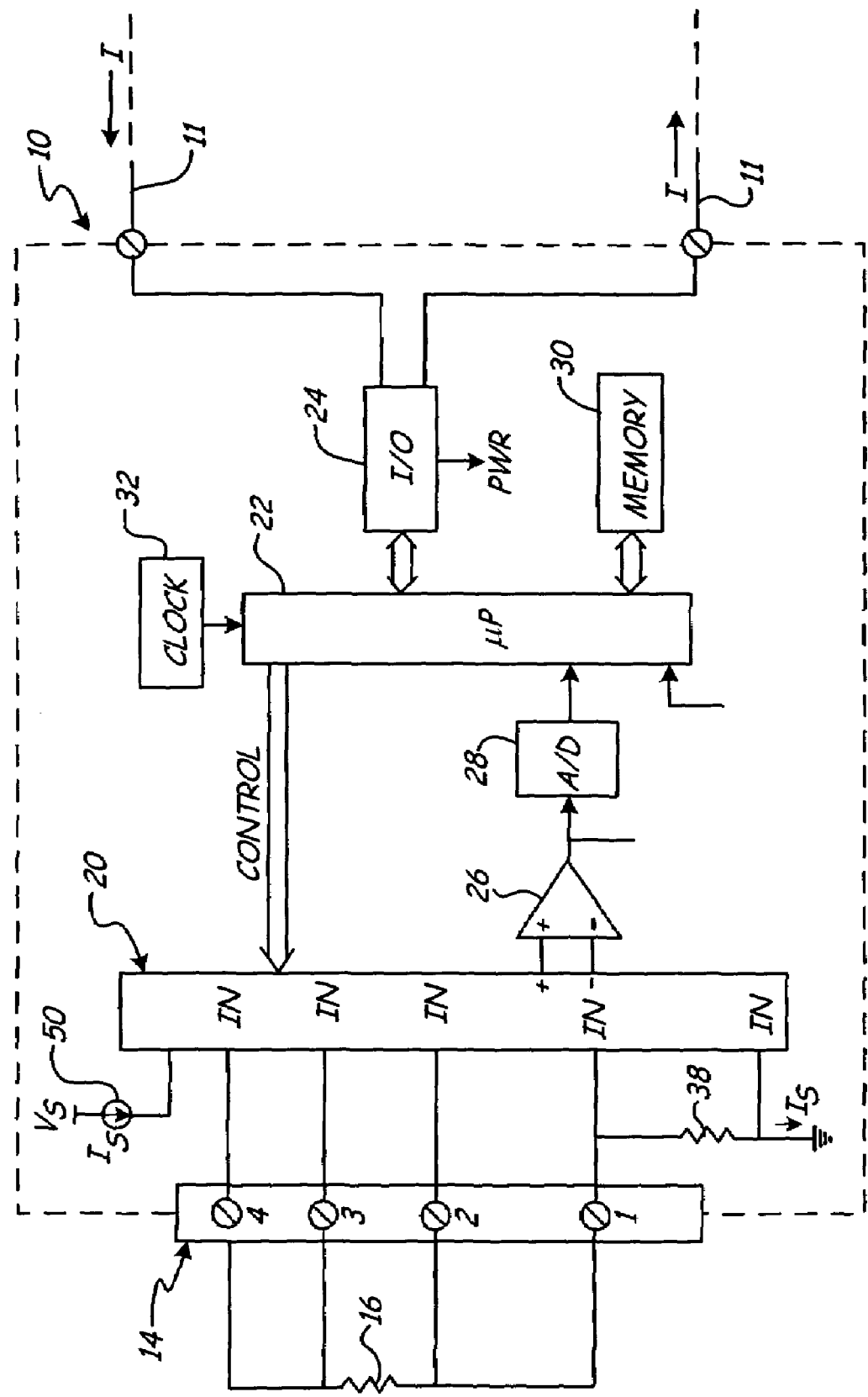
FIG. 1A is a simplified diagram of a temperature transmitter coupled to an RTD sensor.

FIG. 1A is a block diagram of temperature transmitter 10 connected to measure temperature with an RTD sensor.

Transmitter 10 couples to process control loop 11 which provides power to transmitter 10 and over which information is transmitted and received. Alternatively, process control loop 11 may employ various wireless techniques or configurations. In this embodiment, transmitter 10 preferably includes terminal block 14 having terminals 1 through 4 for coupling to, for example, an RTD temperature sensor 16 or a thermocouple temperature sensor 18 (shown in FIG. 1B). FIG. 1A shows the electrical connections to RTD 16. Sensor 16 (and sensor 18) can be either internal or external to transmitter 10. Transmitter 10 includes multiplexer 20 controlled by microprocessor 22 which is coupled to control loop 11 through input/output (I/O) circuitry 24. Multiplexer 20 multiplexes appropriate sets of analog signals, including signals from terminals 1 through 4, to positive and negative inputs of differential amplifier 26, which connects to high accuracy A/D converter 28. Memory 30 stores instructions and information for microprocessor 22, which operates at a speed determined by clock 32. Multiplexer 20 selectively connect input pairs to the positive and negative inputs of differential amplifier 26. A reference resistance $R_{REF}$ 38 couples to multiplexer 20 and is connected in series with RTD 16.

In operation, transmitter 10 measures temperature of sensor 16 and transmits a representation of temperature over control loop 11. Transmitter 10 employs the following equation to compute the major value of temperature of RTD 16:

$$R_{INPUT} = \frac{V_{RINPUT}}{V_{RREF}}(R_{REFNOM}) \qquad \text{Equation 1}$$

where:
$R_{REFNOM}$ the nominal resistance of the reference resistance in ohms, and/or stored in memory 30;
$V_{RINPUT}$ voltage drop across the input; and
$V_{RREF}$ voltage drop across $R_{REF}$.

Current source 50 provides current $I_S$ through sensor 16 (via terminals 1 and 4) and reference resistor 38 through MUX 20. In the configuration of FIG. 1A, microprocessor 22 measures the voltage drop ($V_{RINPUT}$) across RTD 16 between terminals 2 and 3, and the voltage drop ($V_{RREF}$) across resistor 38 with MUX 20. $R_{REFNOM}$ is a calculation constant and is retrieved from memory 30. In a four-wire resistance measurement such as this, the voltage drop across the connections to terminals 2 and 3 is largely eliminated, because substantially all the current flows between terminals 1 and 4, and has little impact on the accuracy of the measurement. $R_{INPUT}$ is converted to temperature units with a look-up table or suitable equation stored in memory 30.

Figure 1B:
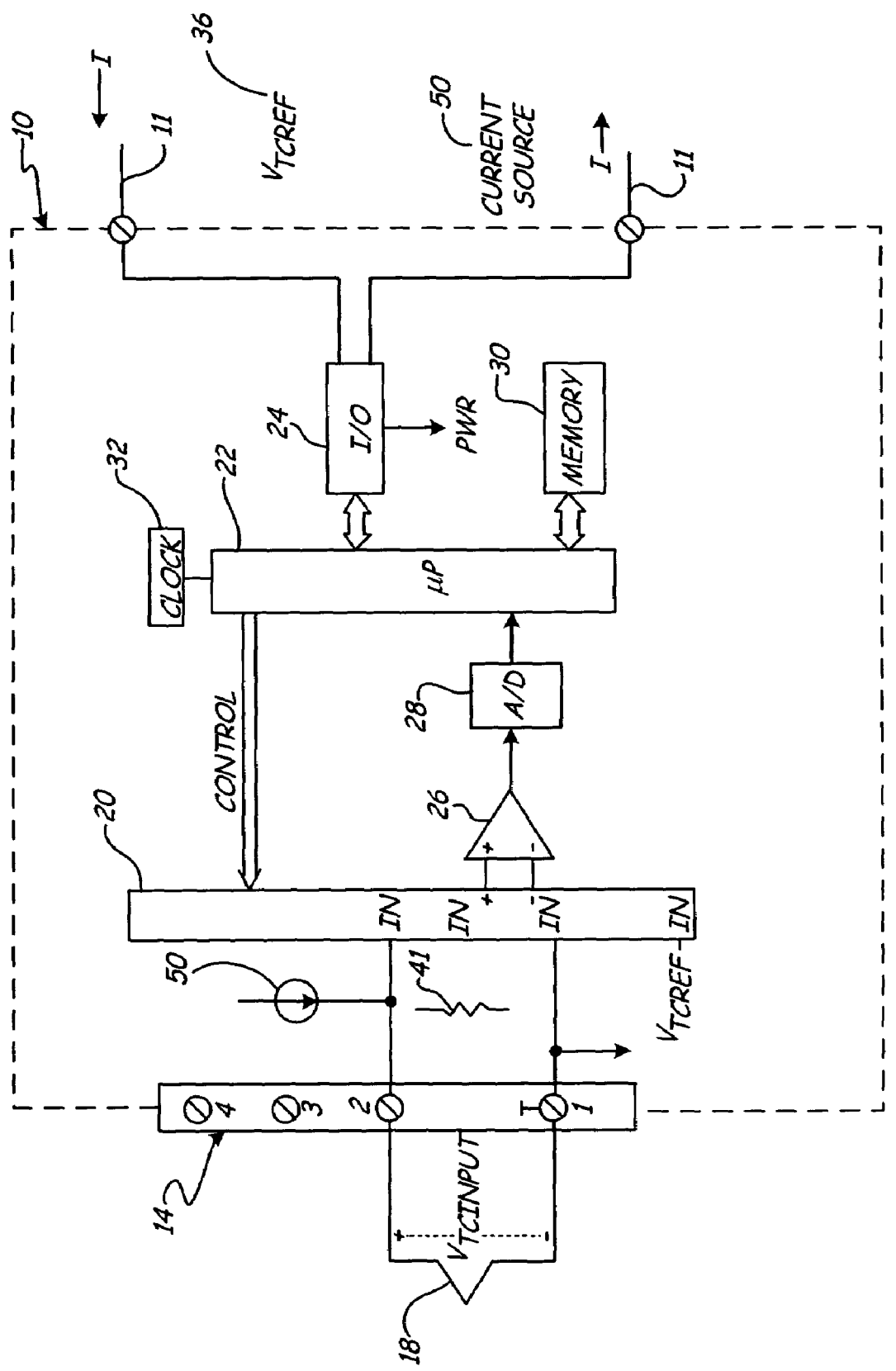
FIG. 1B is a simplified diagram of a temperature transmitter coupled to a thermocouple sensor.

In the configuration FIG. 1B, transmitter 10 is connected to measure temperature with thermocouple sensor 18 which creates a voltage $V_{TCINPUT}$ across terminals 1 and 2. Multiplexer 20 couples inputs of differential amplifier 26 to terminals 2 and 1. FIG. 1B shows a voltage reference ($V_{TCREF}$) 36 coupled to MUX 20 and current source 50. A heater 41 is provided for determining the orientation of thermocouple sensor 18 as discussed below. Heater 41 is controlled by microprocessor 22.

Transmitter 10 measures the temperature of thermocouple sensor 18 by determining the thermocouple voltage $V_{TC}$ with the following equation:

$$V_{TC} = \frac{V_{TCINPUT}}{V_{TCREF}}(V_{TCREFNOM}) \qquad \text{Equation 2}$$

where:
$V_{TCINPUT}$=the measured voltage across terminals 1 and 2 of terminal block 14 sensed by amplifier 26;
$V_{TCREF}$=the measured voltage generated by voltage reference 36 as sensed by amplifier 26;
$V_{TCREFNOM}$=a nominal value of voltage reference 36 stored in memory 30;

The temperature sensors 16 and 18 illustrated in FIGS. 1A and 1B are typically connected to the transmitter 10 when the transmitter 10 is located in the field. Thus, the operator that connects the temperature sensor 16, 18 to transmitter 10 may couple the leads of the sensor 16, 18 to any one of the four terminals 1, 2, 3 and 4. However, for the microprocessor 22 to obtain accurate temperature measurements, the orientation and configuration of the leads of the sensor 16, 18 must be known. This can, for example, require that the sensor be connected to the transmitter at a particular orientation. Alternatively, information can be input to the transmitter 10 which instructs the microprocessor 22 regarding the orientation of the sensor 16, 18. With the present invention, the microprocessor 22 performs a number of tests on the sensor 16, 18 in order to determine the configuration and orientation of the sensor.

FIG. 2A is a flow chart 100 showing steps in accordance with the present invention and FIGS. 2B, 2C and 2D are show example configurations of the sensor 16 of the RTD sensor 16 coupled to transmitter 10. Further, the following table, Table 1 shows three cases regarding the resistance measured between pairs of terminals T12 is between terminals 1 and 2, T13 is between terminals 1 and 3 and T14 is between terminals 1 and 4.

TABLE 1

|     | Case 1 | Case 2 | Case 3 |
| --- | --- | --- | --- |
| T12 | L | L + S | L + S |
| T13 | L + S | L | L + S |
| T14 | L + S | L + S | L |

L = Leadwire (ohms)
S = Sensor (ohms)
Assumption: S >> L

Flow chart 100 is initiated by measuring the resistance between terminals 1 and 2. If an open circuit is determined, microprocessor 22 determines that the sensor 16 is not a four-wire sensor and that terminal 1 or terminal 2 is not used. Alternatively, the resistance between terminals 1 and 2 are stored in memory and another measurement between terminals 1 and 3 is obtained. If this measurement indicates that the connection is an open circuit, then the microprocessor 22 determines that the sensor is not a four-wire sensor and that terminal 3 is not in use. Alternatively, the resistance between terminals 1 and 3 is stored in memory. Next, the resistance between terminals 1 and 4 is measured. If this resistance indicates an open circuit, then the microprocessor 22 determines that the sensor 16 is not a four-wire sensor and that terminal 4 is not in use. Alternatively, the resistance between terminals 1 and 4 is stored in memory. Based upon the measured resistances, the location of the sensor 16 (Case 1, Case 2 or Case 3 as illustrated in FIGS. 2B, 2C and 2D, respectively) is determined based upon information in Table 1 above.

Figure 3A:
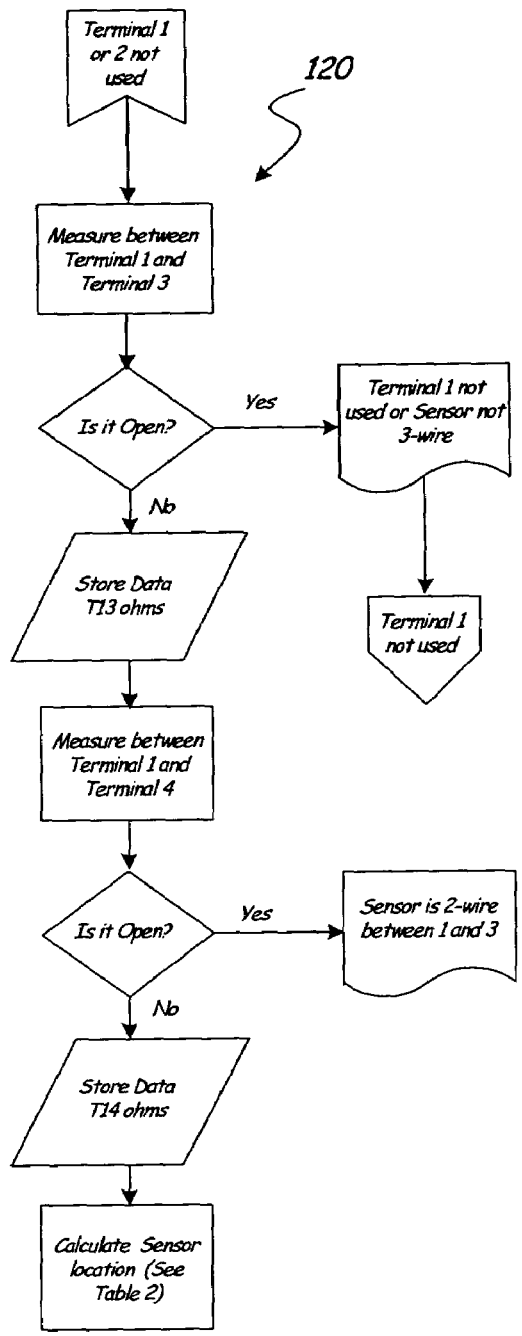
FIG. 3A is a flow chart showing steps performed by the temperature transmitter.
Figure 3B:
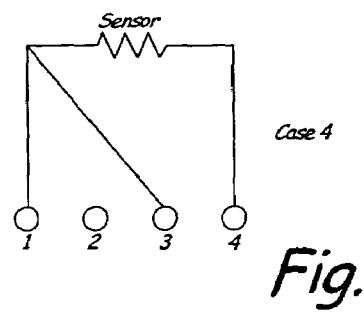
FIGS. 3B, 3C and 3D show cases 4, 5 and 6 respectively of an orientation of an RTD.
Figure 3C:
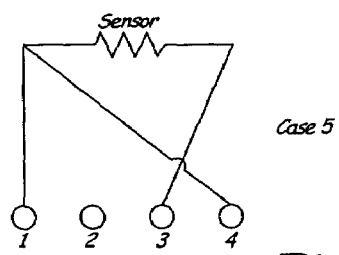
Figure 3D:
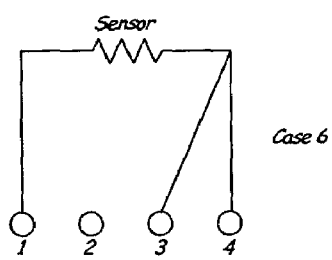

FIG. 3A is a flow chart 120 showing subsequent steps performed by microprocessor 22 in determining the location of sensor 16 and FIGS. 3B, 3C and 3D show cases 4, 5 and 6 respectively, of the orientation sensor 16 as set forth in Table 2:

TABLE 2

|     | Case 4 | Case 5 | Case 6 |
| --- | --- | --- | --- |
| T13 | L | L + S | L + S |
| T14 | L + S | L | L + S |

L = Leadwire (ohms)
S = Sensor (ohms)
Assumption: S >> L

Flow chart 120 begins with microprocessor 22 measuring determining that the terminal 1 or terminal 2 is not used. Next, the resistance between terminals 1 and 3 is measured. If this is an open circuit, then terminal 1 is not used or sensor is not a three wire sensor. Alternatively, the resistance between terminals 1 and 3 is stored in memory. Next, microprocessor 22 measures the resistance between terminals 1 and 4. If this is an open circuit, microprocessor 22 determines that the sensor 16 is a two wire sensor connected between terminals 1 and 3. Alternatively, the resistance between terminals 1 and 4 is stored in memory. Finally, microprocessor 22 identifies the location of sensor 16 based upon the data collected and the information shown in Table 2 above.

Figure 4A:
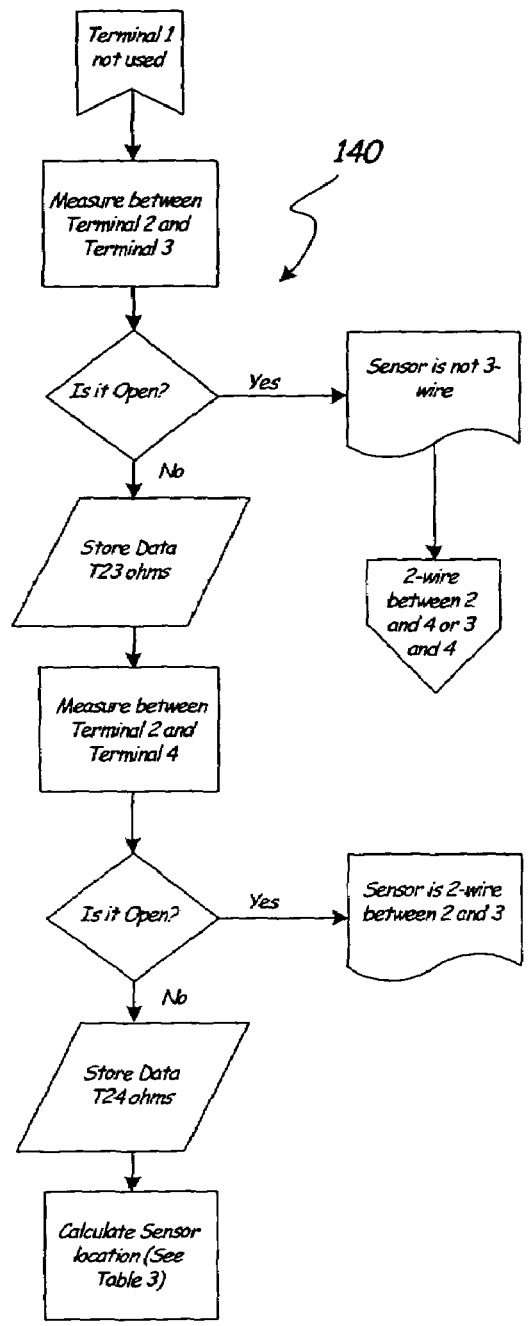
FIG. 4A is a flow chart showing steps performed by the temperature transmitter.
Figure 4B:
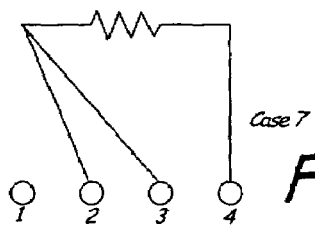
FIGS. 4B, 4C and 4D show cases 7, 8 and 9 respectively of an orientation of an RTD.
Figure 4C:
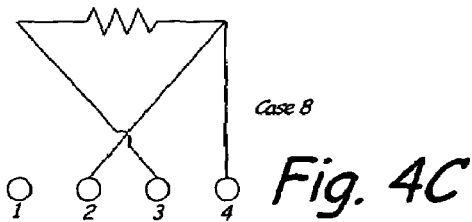
Figure 4D:
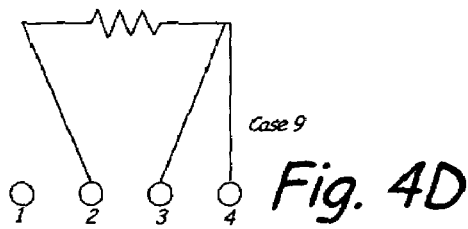

FIG. 4A is a flow chart 140 showing subsequent steps performed by microprocessor 22 and FIGS. 4B, 4C and 4D show cases 7, 8 and 9 respectively, of the orientation of the sensor 16 based upon data contained in Table 3:

TABLE 3

|     | Case 7 | Case 8 | Case 9 |
| --- | --- | --- | --- |
| T23 | L | L + S | L + S |
| T24 | L + S | L | L + S |

L = Leadwire (ohms)
S = Sensor (ohms)
Assumption: S >> L

In flow chart 140 begins with microprocessor 22 having determined that terminal 1 is not used. Next, the resistance between terminals 2 and 3 is measured. If this indicates an open circuit, then the sensor is not a three wire sensor but is a two wire sensor coupled between terminal 2 and 4 or between terminals 3 and 4. Alternatively, data related to the resistances is stored in memory. Next, microprocessor 22 measures the resistance between terminals 2 and 4. If this resistance indicates an open circuit, then the sensor is a two wire sensor connected between terminals 2 and 3. Alternatively, the resistance between terminals 2, 3, and 4 is stored in memory. Finally, the microprocessor identifies the location of the sensor 16 based upon information contained in Table 3 above.

Figure 5A:
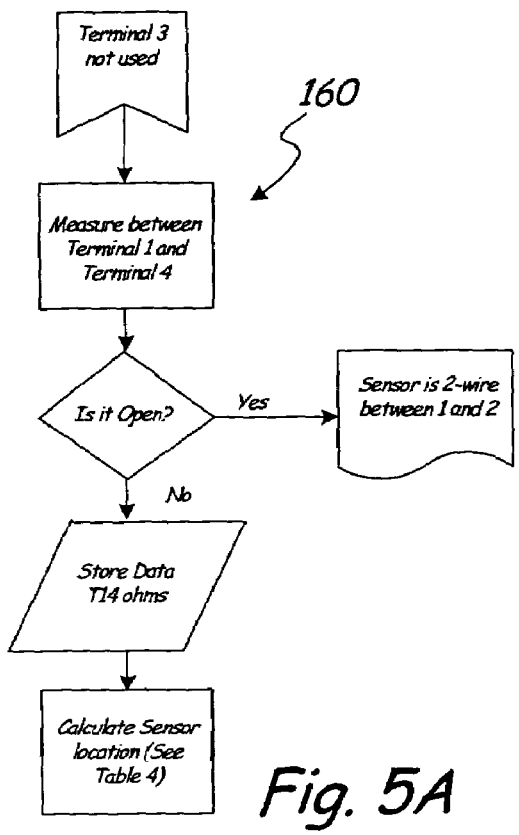
FIG. 5A is a flow chart showing steps performed by the temperature transmitter.
Figure 5B:
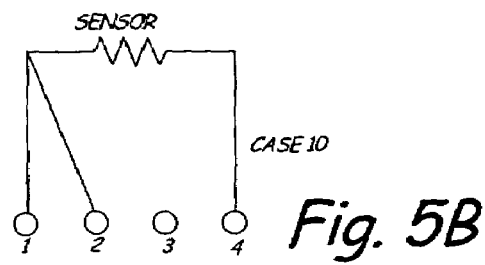
FIGS. 5B, 5C and 5D show cases 10, 11 and 12 respectively of an orientation of an RTD.
Figure 5C:
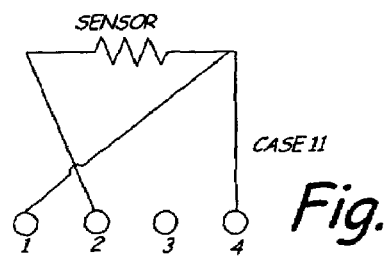
Figure 5D:
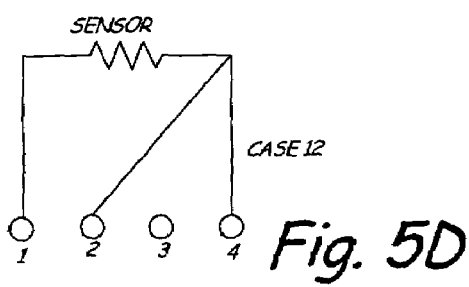

FIG. 5A is a flow chart 160 showing subsequent steps performed by microprocessor 22 and FIGS. 5B, 5C and 5D show cases 10, 11 and 12, respectively regarding the configuration of sensor 16 as illustrated in Table 4:

TABLE 4

|  | Case 10 | Case 11 | Case 12 |
| --- | --- | --- | --- |
| T12 | L | L + S | L + S |
| T14 | L + S | L | L + S |

L = Leadwire (ohms)
S = Sensor (ohms)
Assumption: S >> L

Flow chart 160 is initiated when it is determined that terminal 3 is not used. Next, the resistance between terminals 1 and 4 is measured. If this is an open circuit, then microprocessor 22 determines that sensor 16 is a two-wire sensor connected between terminals 1 and 2. Alternatively, the resistance is stored and microprocessor 22 calculates the sensor location based upon the data contained in Table 4 above.

Figure 6A:
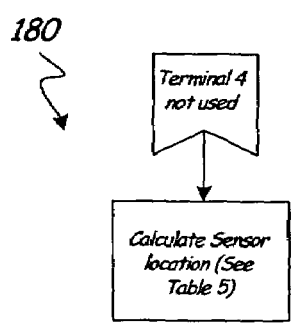
FIG. 6A is a flow chart showing steps performed by the temperature transmitter.
Figure 6B:
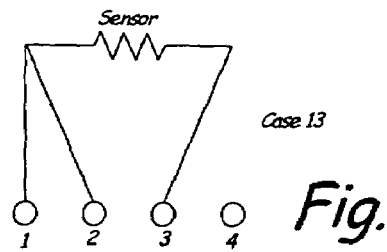
FIGS. 6B, 6C and 6D show cases 13, 14 and 15 respectively of an orientation of an RTD.
Figure 6C:
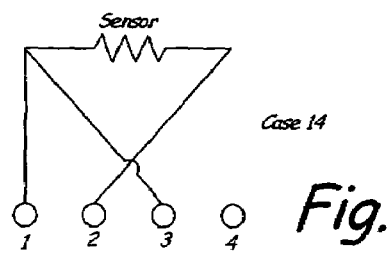
Figure 6D:
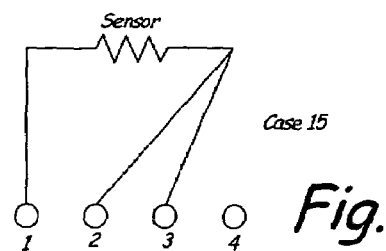

FIG. 6A is a flow chart 180 illustrating steps in accordance with the present invention when terminal 4 is not used. FIGS. 6B, 6C and 6D illustrate possible cases 13, 14 and 15 regarding the location of sensor 16 as set forth in Table 5:

TABLE 5

|  | Case 13 | Case 14 | Case 15 |
| --- | --- | --- | --- |
| T12 | L | L + S | L + S |
| T13 | L + S | L | L + S |

L = Leadwire (ohms)
S = Sensor (ohms)
Assumption: S >> L

In flow chart 180, the microprocessor 22 calculates the location of sensor 16 based upon data stored in Table 5 above.

Figure 7:
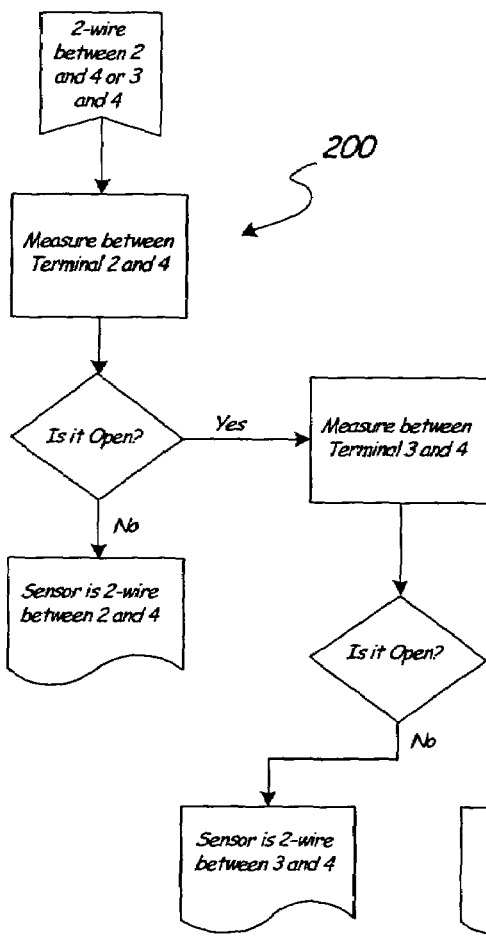
FIG. 7 is a flow chart showing steps performed by the temperature transmitter.

FIG. 7 is a flow chart 200 illustrating steps performed by microprocessor 22 if it is determined that the sensor 16 is a two wire sensor between terminals 2 and 4 or between terminals 3 and 4. Microprocessor 22 measures the resistance between terminals 2 and 4. If this is not an open circuit, then the sensor is a two wire sensor connected between terminals 2 and 4. Alternatively, microprocessor measures the resistance between terminals 3 and 4. If this is an open circuit, then microprocessor 22 determines that a sensor has not been connected. Alternatively, microprocessor 22 determines that the sensor is a two wire sensor coupled between terminals 3 and 4.

FIGS. 8A and 8B all relate to the determination of the polarity of a thermalcouple 18 coupled to transmitter 10. FIG. 8A is a flow chart showing steps executed by microprocessor 22 and FIG. 8B is an example configuration of the thermocouple. In flow chart 220, microprocessor 22 measures the voltage across terminals 1 and 2. This is recorded as a baseline value, $V_{base}$. Next, terminals 1 and 2 (or the cold junction formed by thermocouple 16) are heated using heater 41. Heater 41 can be configured to operate under the control of the microprocessor 22. The microprocessor 22 then records the heated voltage value $V_{heat}$. Next, if $V_{heat}$ is greater than $V_{base}$, microprocessor 22 determines that terminal 2 is the positive lead of the thermocouple. Alternatively, microprocessor 22 determines that terminal 1 is the positive lead.

The various steps set forth in the flow charts can be arranged as desired. Typically, the steps are performed using program instructions stored in memory 30 and executed by microprocessor 22.

Although the present invention has been described with reference to preferred embodiments, workers skilled in the art will recognize that changes may be made in form and detail without departing from the spirit and scope of the invention. Although the measurement circuitry is described as measuring resistance or voltage, any appropriate electrical parameter can be measured. As used herein, "measurement circuitry" can optionally include a microprocessor, or steps performed by a microprocessor, and/or additional digital or analog circuitry.

What is claimed is:

1. A process variable transmitter for measuring a temperature of a process, comprising:

a first terminal configured to couple to a temperature sensitive element;

a second terminal configured to couple to the temperature sensitive element;

a third terminal configured to couple to the temperature sensitive element;

a fourth terminal configured to couple to the temperature sensitive element;

measurement circuitry configured to measure an electrical parameter between a pair of the terminals; and a microprocessor configured to identify a location relative to the terminals, of the temperature sensitive element coupled to at least two of the terminals based upon an electrical parameter measured by the measurement circuitry between at least two pairs of terminals, the microprocessor further configured to calculate a temperature of the temperature sensitive element based upon the measured parameter and the identified location of the temperature sensitive element wherein the calculated temperature is a function of the identified location of the temperature sensitive element.

2. The apparatus of claim 1 including a heating element configured to heat two of the terminals and wherein the microprocessor is further configured to determine a polarity of a thermocouple connected between two of the two terminals in response to applied heat.

3. The apparatus of claim 1 wherein the electrical parameter comprises resistance.

4. The apparatus of claim 1 wherein the electrical parameter comprises voltage.

5. The apparatus of claim 1 wherein the microprocessor determines if a connection between a pair of terminals comprises a lead wire connection.

6. The apparatus of claim 1 wherein the microprocessor determines if the connection between a pair of terminals comprises a sensor connection.

7. The apparatus of claim 1 wherein the microprocessor determines if the temperature sensitive element comprises a two lead element.

8. The apparatus of claim 7 wherein the microprocessor determines which of the leads connect to which of the terminals.

9. The apparatus of claim 1 wherein the microprocessor determines if the temperature sensor comprises a three wire element.

10. The apparatus of claim 9 wherein the microprocessor determines which of the leads connect to which of the terminals.

11. The apparatus of claim 1 wherein the microprocessor determines if the temperature sensitive element comprises a four wire element.

12. The apparatus of claim 11 wherein the microprocessor determines which of the wires connect to which of the terminals.

* * * * *